May 17, 1932. K. E. LYMAN 1,858,335
BRAKE
Filed Feb. 2, 1929

INVENTOR.
Kenneth E. Lyman
BY H. O. Clayton
ATTORNEY

Patented May 17, 1932

1,858,335

UNITED STATES PATENT OFFICE

KENNETH E. LYMAN, OF ROCKFORD, ILLINOIS, ASSIGNOR TO BENDIX BRAKE COMPANY, OF SOUTH BEND, INDIANA, A CORPORATION OF ILLINOIS

BRAKE

Application filed February 2, 1929. Serial No. 337,149.

This invention relates to brakes and is illustrated as embodied in an internal expanding automobile brake. An object of the invention is to provide an inexpensive but very rigid support for the anchors of the brake, or for equivalent parts. Preferably the support is a stamping, generally rectangular in shape, and provided with either spaced depressions or a continuous depression serving as a local reinforcement for the brake anchor pins passing therethrough.

A further feature of the invention relates to a novel type of anchor pin, preferably rolled from sheet metal stock and which may be readily secured as by welding to the anchor reinforcement referred to.

I also suggest a novel combination of articulating pin and automatic friction stop plate both to be fabricated from sheet metal. In the arrangement illustrated a very simple and effective combination of these parts includes an articulating pin rolled from sheet steel stock having portions cut away at one end thereof to provide openings through which a novel pressed metal friction stop pin is adapted to pass. The stop is preferably provided with a tongue somewhat loosely fitting the opening referred to, the size of the parts being predetermined to effect the automatic adjustment to be more fully described hereafter. A uniform clearance between the drum and lining is thus preserved throughout the life of the lining.

The above and other objects and features of the invention, including various novel and desirable details of construction and combinations of parts will be apparent from the following description of the illustrative embodiments shown in the accompanying drawings, in which.

Figure 1:
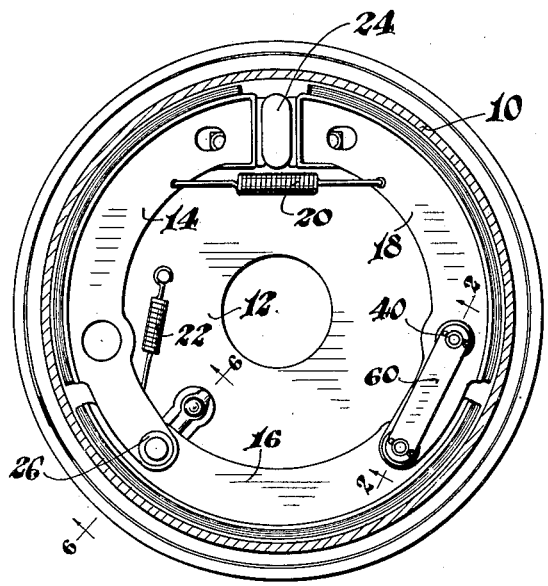
Figure 1 is a vertical section through the brake taken just inside the head of the brake drum, and showing the brake shoes in side elevation.
Figure 2:
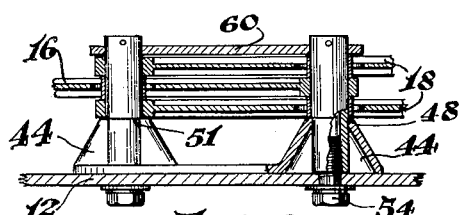
Figure 2 is a partial section taken on the line 2—2 of Figure 1, showing my novel brake anchor pins and support therefor.
Figure 3:
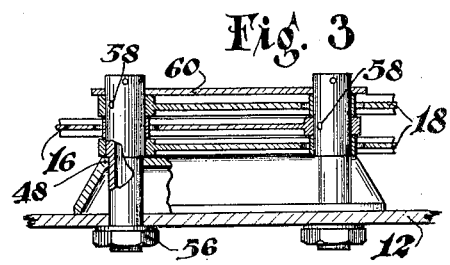
Figure 3 is a view similar to Figure 2 indicating a modified form of anchor pin and support.
Figure 4:
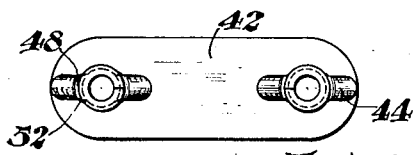
Figure 5:
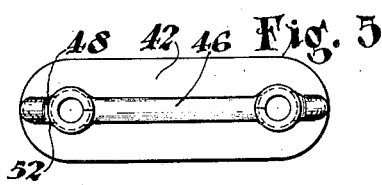
Figure 6:
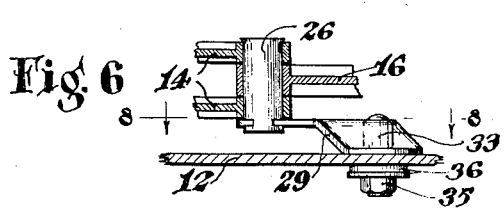
Figure 7:
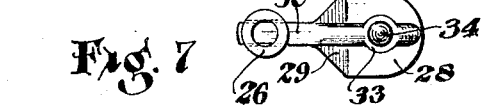
Figure 8:
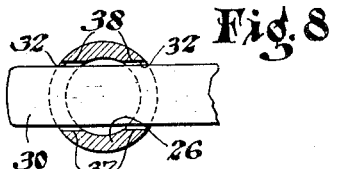

Figures 4 and 5 indicate plan views of the anchor pin and support structures of Figures 2 and 3;

Figures 6 and 7 show, in detail, side and plan views respectively of my novel articulating pin and friction stop; and Figure 8 is an enlarged section taken on line 8—8 of Figure 6 showing in better detail the articulating pin and friction stop connection thereto.

The brake selected for illustration is a three shoe brake of the type fully described in Patent #1,567,716, granted Bendix Brake Company on December 29, 1925, on application of A. Y. Dodge. It includes generally a rotatable drum 10, and a backing plate or other support 12 for three shoes 14, 16 and 18 arranged inside of the drum. As fully explained in the Dodge patent, and as shown in Figures 2 and 3, shoes 14 and 18 are forked to straddle the opposite ends of shoe 16.

The brake is applied, against the resistance of suitable return springs 20 and 22, by means such as a double cam 24.

Shoes 16 and 18 are connected by a floating pivot 26 preferably loosely journaled in the shoe ends for a purpose hereafter described.

According to one important feature of my brake structure, I provide a novel automatically adjusted stop for shoes 14 and 16 preferably comprising a flat stamping 28 inclined at one end at 29 and having a tongue 30 extending therefrom, which tongue is adapted to pass through oppositely disposed openings 32 in the pin 26. I prefer to form the pin from a flat stamping, rolling the same to the tubular shape disclosed. The stop 28 may be provided with an embossed portion 33 shaped to surround a fastening pin 34 and preferably welded thereto. The pin is adapted to pass through the backing plate and is constructed to receive a nut 35 and washers 36 thereby frictionally confining the stop to the plate.

The openings 32 are of such size that a very small amount of play is given to the tongue and the cuts in the pin 26 are also so formed as to present, for the tongue, flat surfaces of contact 37 and 38, two such surfaces lying on either side of the pin, all of which is clearly disclosed in Figure 8.

With the application of the brake the shoe 16 with the pin 26 moves in an arc about an anchor 40 as a center and the clearance between the pin and flats 38 is so predetermined that with a new lining installation the pin just contacts said flats without disturbing the stop. Upon release of the brake the return springs 20 and 22, particularly the latter, functions to separate the shoe and drum to bring flats 37 of the movable pin 26 against the tongue of the stop, the frictional engagement of the stop with the backing plate being sufficient to prevent movement of the stop.

With the second and further applications of the brake an increased movement of the shoe 16 is effected, which is the result of the normal wear of the lining. The increased lining clearance that would otherwise result is compensated for by the movement of the stop, the flats 38 contacting the tongue to force, with each brake application, a slight movement of the stop about its pin 34 as a center. With each subsequent release of the brake the pin 26 revolves slightly, thereby always maintaining the flats 37 and 38 parallel to the tongue and inasmuch as the distance between the flats is constant, there results a uniform lining clearance throughout the life of the lining.

As an additional feature of my invention, I provide an inexpensive but very rigid anchor pin and support construction for the shoes 16 and 18. A bracket 42 which is preferably a flat steel stamping is so pressed as to form either the spaced tapered embossments 44 of Figure 2 or the narrow tapered projection 46 of Figure 3 both flanged and enlarged at 48 to support novel anchor pins.

As disclosed in Figure 2, these pins may be rolled from flat stampings into tubular shape and are further provided with a reduced portion to provide a shoulder 51 seated upon the flange of the enlargement 48. The pins may be welded to the bracket at 52 and may either be internally threaded to receive the securing bolts 54 or externally threaded to receive the nuts 56 as indicated in Figure 3. Oil holes 58 may be provided in the tubular pins of Figure 3 permitting the bearing to be lubricated from outside the drum through the hollow pins. A strap 60 may furthermore be provided which serves to confine the shoes laterally upon their respective anchors.

While several embodiments of my invention have been described in detail, it is not my intention to limit the scope of the invention to those particular embodiments, or otherwise than by the terms of the appended claims.

I claim:

1. A pivot and mounting comprising two elements arranged to rest against each other, at least one of which comprises a tapered embossment pressed therefrom, a pivot passing through said elements and having a portion engaging one of them on the side opposite the other and a nut threaded on the pivot and engaging said other element to clamp the parts together.

2. A pivot and mounting comprising two elements arranged to rest against each other, at least one of which comprises a tapered embossment pressed therefrom, a tubular pivot passing through said elements and having a shouldered portion engaging said embossment on the side opposite the other and a nut threaded on the pivot and engaging said other element to clamp the parts together.

3. A stamped bracket for a brake anchor having an embossed portion enlarged at or about its center and perforated to provide an opening for a fastening.

4. A stamped bracket comprising spaced tapered embossments pressed therefrom and orificed to accommodate tubular anchor elements to be passed therethrough.

5. A hollow brake anchor pin of cylindrical outline reduced in external diameter at one end thereof and provided with a plurality of holes in its side wall for the purpose described.

6. A brake comprising, in combination, a rotatable element to be braked, a friction device adaptable for cooperation with said rotatable member and a support for the friction element comprising a hollow tubular member reduced in external diameter at one end thereof, and a member having a swaged portion apertured to receive the reduced portion of the hollow tubular member.

7. A bracket comprising a stamping having an embossed portion reinforced by lateral ribs.

8. A bracket comprising a stamping having an embossed portion apertured and reinforced by lateral ribs.

9. A bracket comprising a stamping having an embossed portion provided with an aperture, a bearing surface surrounding the aperture and ribs reinforcing the embossed portion.

10. A bracket comprising a stamping having spaced embossed portions provided with apertures, bearing surfaces surrounding the apertures and embossed ribs reinforcing the spaced embossed portions.

In testimony whereof, I have hereunto signed my name.

KENNETH E. LYMAN.